United States Patent
Blankenship et al.

(10) Patent No.: US 8,300,588 B2
(45) Date of Patent: Oct. 30, 2012

(54) SYSTEM AND METHOD FOR USER EQUIPMENT MEASUREMENT TIMING IN A RELAY CELL

(75) Inventors: Yufei Blankenship, Kildeer, IL (US); Deping Liu, Schaumburg, IL (US); Xiang Chen, Rolling Meadows, IL (US)

(73) Assignee: FutureWei Technologies, Inc., Plano, TX (US)

( * ) Notice: Subject to any disclaimer, the term of this patent is extended or adjusted under 35 U.S.C. 154(b) by 201 days.

(21) Appl. No.: 12/895,496

(22) Filed: Sep. 30, 2010

(65) Prior Publication Data

US 2011/0080962 A1 Apr. 7, 2011

Related U.S. Application Data

(60) Provisional application No. 61/248,733, filed on Oct. 5, 2009.

(51) Int. Cl.
*H04Q 7/00* (2006.01)
(52) U.S. Cl. .......................................... 370/329; 370/330
(58) Field of Classification Search .................. 370/338, 370/328, 329, 330, 350, 491, 500, 503; 455/452, 455/464, 509, 517
See application file for complete search history.

(56) References Cited

U.S. PATENT DOCUMENTS

| | | | | |
|---|---|---|---|---|
| 8,174,995 | B2 * | 5/2012 | Malladi | 370/252 |
| 2008/0089312 | A1 * | 4/2008 | Malladi | 370/345 |
| 2010/0317343 | A1 * | 12/2010 | Krishnamurthy et al. | 455/435.1 |
| 2011/0034165 | A1 * | 2/2011 | Hsu | 455/423 |
| 2011/0128893 | A1 * | 6/2011 | Park et al. | 370/279 |
| 2011/0261751 | A1 * | 10/2011 | Ode et al. | 370/315 |

OTHER PUBLICATIONS

"3rd Generation Partnership Project; Technical Specification Group Radio Access Network; Evolved Universal Terrestrial Radio Access (E-UTRA); Requirements for Support of Radio Resource Management (Release 8)," 3GPP TS 36.133, V8.5.0, Mar. 2009, 201 pages.

"3rd Generation Partnership Project; Technical Specification Group Radio Access Network; Evolved Universal Terrestrial Radio Access (E-UTRA); Physical layer—Measurements (Release 8)," 3GPP TS 36.214, V8.6.0, Mar. 2009, 12 pages.

"3rd Generation Partnership Project; Technical Specification Group Radio Access Network; Evolved Universal Terrestrial Radio Access (E-UTRA) Radio Resource Control (RRC); Protocol Specification (Release 8)," 3GPP TS 36.331, V8.5.0, Mar. 2009, 204 pages.

* cited by examiner

*Primary Examiner* — Chuong T Ho
(74) *Attorney, Agent, or Firm* — Slater & Matsil, L.L.P.

(57) ABSTRACT

A system and method for user equipment (UE) measurement timing in a relay cell are provided. A method for controller operations includes broadcasting a first pattern of time intervals to communications devices served by a controller, and for a communication device served by the controller, determining a second pattern for the communications device, where the second pattern is based on the first pattern, and transmitting the second pattern to the communications device.

20 Claims, 5 Drawing Sheets

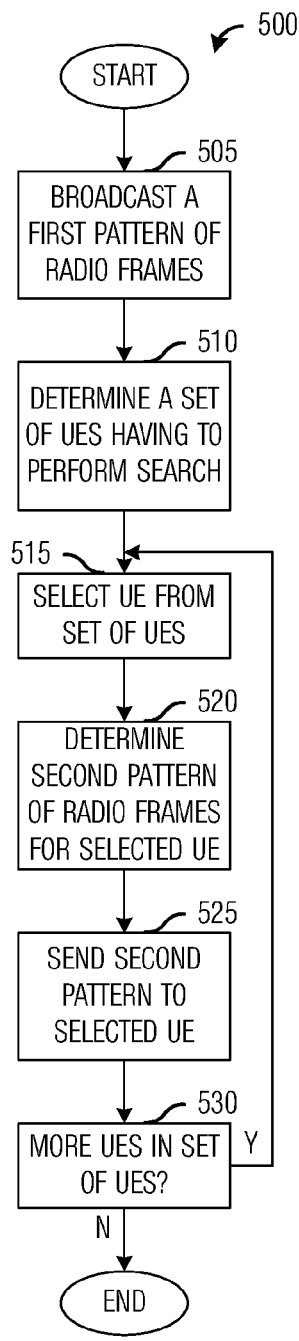
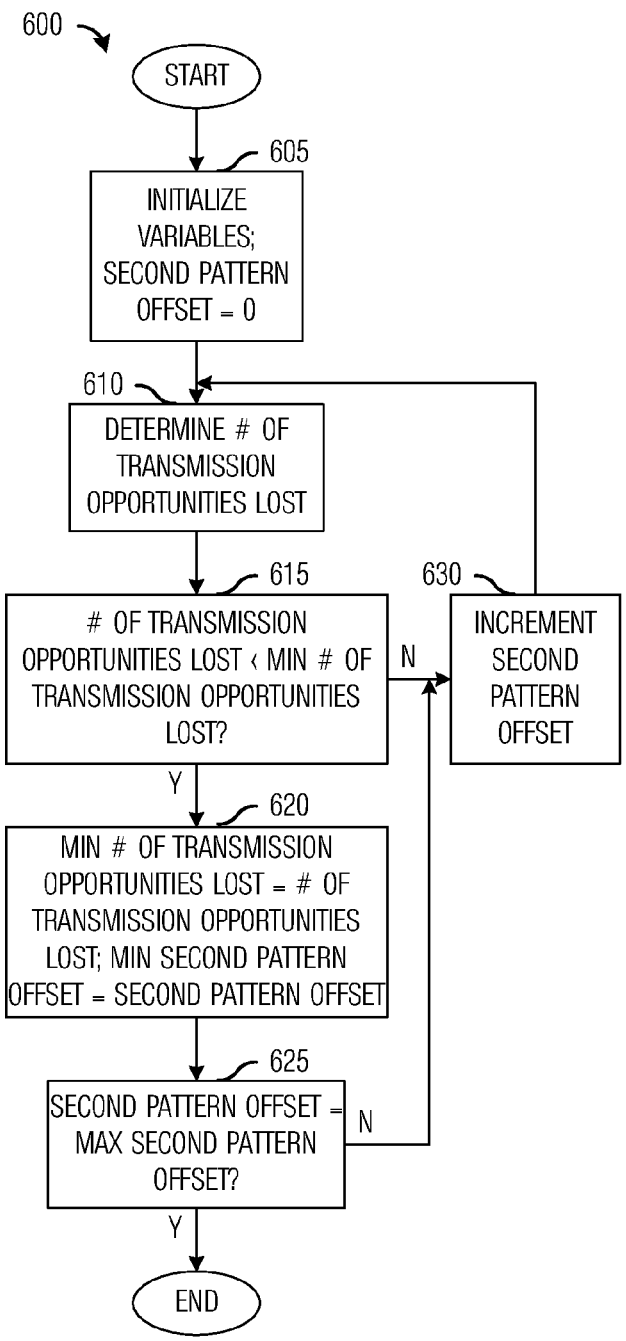
*Fig. 5*  *Fig. 6*

SYSTEM AND METHOD FOR USER EQUIPMENT MEASUREMENT TIMING IN A RELAY CELL

This application claims the benefit of U.S. Provisional Application No. 61/248,733, filed on Oct. 5, 2009, entitled "System and Method for User Equipment Measurement Timing in a Relay Cell," which application is hereby incorporated herein by reference.

TECHNICAL FIELD

The present invention relates generally to wireless communications, and more particularly to a system and method for user equipment (UE) measurement timing in a relay cell.

BACKGROUND

A relay node (RN) is considered as a tool to improve, e.g., the coverage of high data rates, group mobility, temporary network deployment, the cell-edge throughput and/or to provide coverage in new areas. The RN is wirelessly connected to a wireless communications network via a donor cell (also referred to as a donor enhanced Node B (donor eNB or D-eNB)).

There may be several kinds of RNs, one kind serves as an eNB to one or more User Equipment (UE). A wireless link between the RN and its served UEs is referred to as an access link and a link between the RN and its donor eNB is named a relay backhaul link.

To a UE that is being served by the RN, the RN appears identical to an eNB, scheduling uplink (UL) and downlink (DL) transmissions from and to the UE over an access link.

The relay backhaul link of an in-band RN typically operates in the same frequency spectrum as the access link. Therefore, due to the RN's transmitter causing interference to its own receiver, simultaneous "donor eNB-to-RN" and "RN-to-UE" or "UE-to-RN" and "RN-to-donor eNB" transmissions on the same time-frequency resource may not be feasible unless sufficient isolation of outgoing and incoming signals is provided, e.g., by means of specific, well separated, and well isolated antenna structures.

In Long Term Evolution (LTE) Advanced proposed by the Third Generation Partnership Project (3GPP), a solution to the interference problem may be handled by operating the RN such that the RN is not transmitting to UEs when it is supposed to receive data from the donor eNB to create gaps in the RN-to-UE transmission. These gaps during which UEs (including Release-8 (Rel-8) UEs) are not supposed to expect any RN transmission are created by configuring Multi-Media Broadcast over a Single Frequency Network (MBSFN) subframes. RN-to-donor eNB transmissions can be facilitated by not allowing any UE-to-RN transmissions in some subframes. Frames and subframes may be considered to be constructs representing time intervals that are used to transmit/receive information.

Furthermore, a UE may require measurement gaps (contiguous periods of time of specified duration) to identify and measure inter-frequency and/or inter-radio access technology (inter-RAT) cells, an Evolved Universal Terrestrial Radio Access Network (E-UTRAN) must provide a single measurement gap pattern with a constant gap duration, i.e., a periodic pattern of measurement gaps, that allows the UE the ability to concurrently monitor all frequency layers and RATs, i.e., available frequency bands. During the measurement gaps, the UE shall not transmit any data, and the UE is not expected to tune its receiver on the E-UTRAN serving carrier frequency.

Hence, there may be a significant number of times when the UE may not receive any data due to the MBSFN subframes and the measurement gaps. Therefore, there may be a desire to reduce the actual number of times when the UE may not receive any data by overlapping the MBSFN subframes and the measurement gaps as much as possible.

SUMMARY OF THE INVENTION

These and other problems are generally solved or circumvented, and technical advantages are generally achieved, by embodiments of a system and method for UE measurement timing in a relay cell.

In accordance with a preferred embodiment of the present invention, a method for controller operations is provided. The method includes broadcasting a first pattern of time intervals to communications devices served by a controller, and for a communication device served by the controller, determining a second pattern for the communications device, where the second pattern is based on the first pattern, and transmitting the second pattern to the communications device.

In accordance with another preferred embodiment of the present invention, a method for controller operations is provided. The method includes broadcasting a first pattern of time intervals to communications devices being served by the controller, determining a communications device being served by the controller, determining a parameter of a second pattern of time intervals as a function of the first pattern, and transmitting the parameter to the communications device.

In accordance with another preferred embodiment of the present invention, a controller is provided. The controller includes a transmitter, and a second pattern unit coupled to the controller. The transmitter transmits time intervals to communications devices served by the controller. The time intervals are based on a first pattern. The second pattern unit determines a second pattern for a communications device served by the controller. The second pattern is based on the first pattern.

An advantage of an embodiment is that by overlapping a first subframe pattern with a second subframe pattern to minimize a loss of transmission opportunities, the impact of the prohibitions of the two patterns on the UEs is minimized.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIG. 5 is a flow diagram of controller operations in determining a pattern (or an offset for a pattern) for use by a communications device, such as a UE, to minimize transmission opportunity overlap for the communications device;

FIG. 6 is a flow diagram of controller operations in determining a second subframe pattern for a communications device, such as a UE, to minimize transmission opportunity overlap with a first subframe pattern.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a 3GPP LTE compliant communications system with relay nodes. The invention may also be applied, however, to other communications systems with relay nodes, such as WiMAX, and so on, compliant communications systems.

Figure 1:
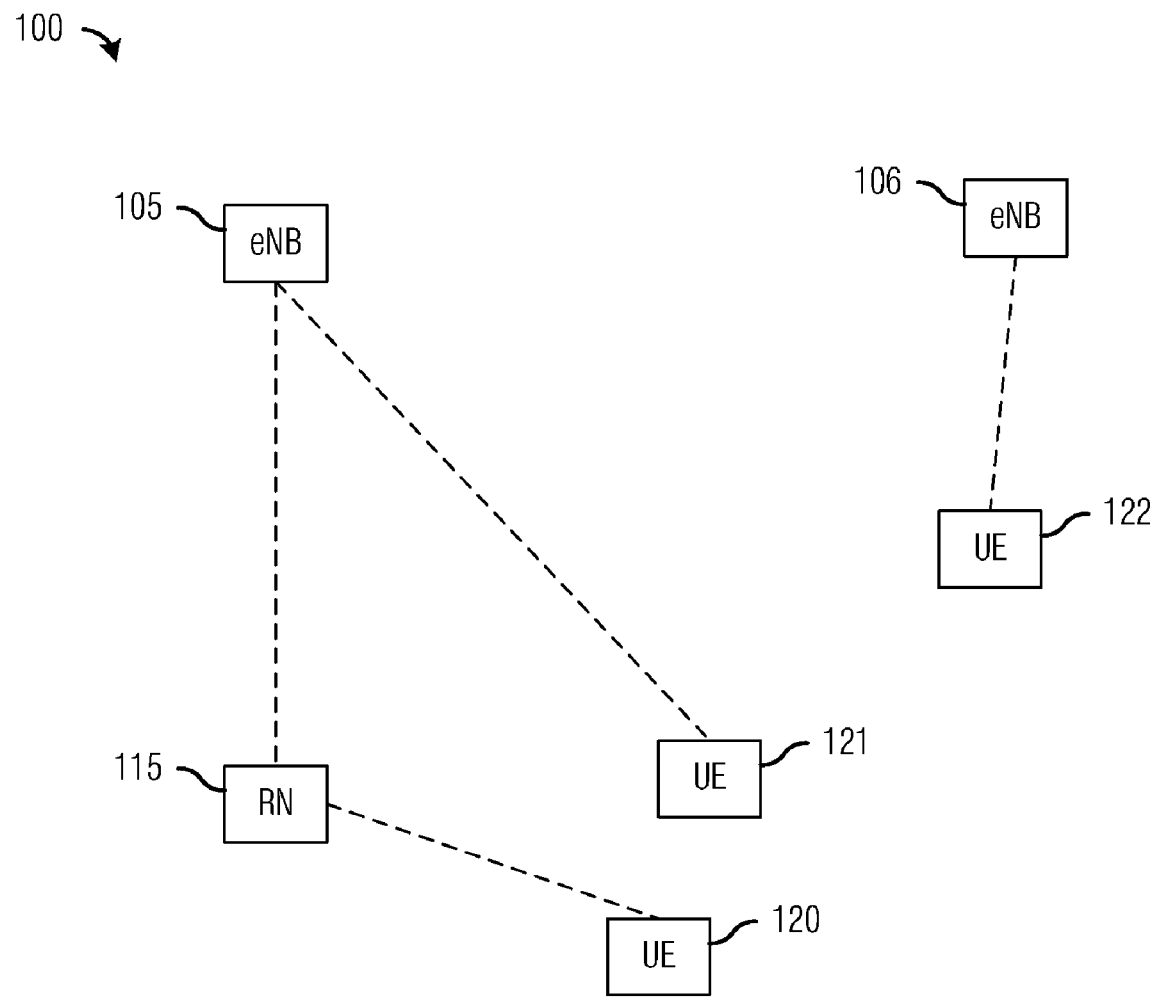
FIG. 1 is a diagram of a communications subsystem.

FIG. 1 illustrates a communications subsystem 100. Communications subsystem 100 includes several eNBs, such as eNB 105 and eNB 106. Communication subsystem 100 also includes a RN 115. As discussed earlier, a RN may be used to improve data transfer rates, mobility, coverage, throughput, and so forth. A RN is connected through a wireless connection ("wireless relay backhaul") to an eNB, wherein the eNB that is being used to wirelessly connect the RN is referred to as a donor eNB. For example, RN 115 is connected to eNB 105 through a wireless relay backhaul and eNB 105 is the donor eNB of RN 115.

Communication subsystem 100 also includes one or more UEs, such as UE 120, UE 121, and UE 122. As an example, UE 120 represents a UE that is served directly by a RN (RN 115) while UE 121 represents a UE that is served directly by the donor eNB. Similarly, UE 122 is served directly by eNB 106. An eNB may simultaneously serve RN(s) and its own UEs, and a RN can serve several UEs.

To the eNB, the RNs are similar to its other UEs in many aspects. To the UE served by RN, an eNB or RN may be functionally equivalent, with the RN appearing the same as an eNB to its UE (e.g., RN 115 to UE 120). When the UE has information to transmit, the UE must request a wireless resource and can transmit after receiving a UL scheduling grant of the wireless resource from eNB. Similarly, when there is information for the UE, the eNB sends similar downlink (DL) scheduling assignment of the wireless resource to indicate to the UE that the information is being sent and when, where, and how to detect the information.

In order to identify and measure inter-frequency and/or inter-RAT cells, a UE may make use of measurement gaps provided by an evolved UMTS Terrestrial Radio Access Network (E-UTRAN) to make measurements of spectrum. For example, UE 121 may measure spectrum during a measurement gap to identify the presence of eNB 106 or an inter-RAT communications network. UE 121 may later make use of information derived from the measurements made during the measurement gaps, as an example, in a handoff or a handover.

MBSFN Subframes for RN backhaul—According to the 3GPP LTE technical specifications, there is an inherent 10 ms structure, with a 10 ms radio frame composed of 10 one (1) ms subframes, wherein the subframes are numbered from #0 to #9. In a 3GPP LTE compliant communications system, synchronization signals are transmitted in subframes #0 and #5 of a radio frame. To ensure proper behavior of 3GPP LTE Release Eight (Rel-8) UEs connecting to a RN, these subframes should be transmitted by the RN as normal subframes. Furthermore, for FDD, subframe #9 and subframe #4 (in some configurations) are used for paging. For TDD, subframes #1 and #6 are used for paging. The paging subframes should also be transmitted as normal subframes in the downlink DL by the RN. Thus, a set of mandatory unicast subframes are subframes #0, #4, #5, and #9 ({0, 4, 5, 9}) for FDD and subframes #0, #1, #5, and #6 ({0, 1, 5, 6}) for TDD. Also, the set of mandatory unicast subframes constitute the minimum set of subframes upon which the UE can perform mobility measurements.

Figure 2A:
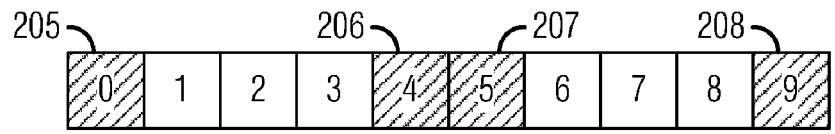
FIG. 2*a* is a diagram of a radio frame for use in FDD.

Therefore, subframes #0, #4, #5, and #9 cannot be used for MBSFN in frequency division duplex (FDD) operation. FIG. 2a illustrates a radio frame 200 for use in FDD. As shown in FIG. 2a, subframes #0 205, #4 206, #5 207, and #9 208 may not be used for MBSFN, while subframes #1, #2, #3, #6, #7, and #8 may be used for MBSFN.

Figure 2B:
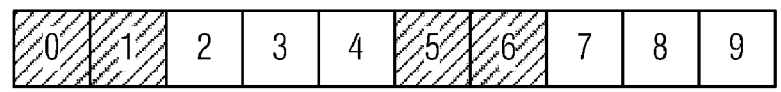
FIG. 2*b* is a diagram of a radio frame for use in TDD.

Similarly, certain subframes cannot be used for MBSFN in time division duplex (TDD) operation. FIG. 2b illustrates a radio frame 250 for use in TDD. As shown in FIG. 2b, subframes #0, #1, #5, and #6 may not be used for MBSFN, while subframes #2, #3, #4, #7, #8, and #9 may be used for MBSFN.

The discussion presented herein focuses on FDD operation for simplicity purposes, however, the same principles discussed herein also applies to TDD. Therefore the focus on FDD operation should not be construed as being limiting to either the scope or the spirit of the embodiments.

Furthermore, the discussion presented herein focuses on the inherent 10 ms structure of an LTE frame with 10 subframes per frame as well as specific subframes that may or may not be used for MBSFN. However, the embodiments may be operable with other frame structures with a different number of subframes per frame and differing arrangements of subframes that allow or disallow use for MBSFN. Therefore, the discussion of a 10 ms structure and 10 subframes per frame should not be construed as being limiting to either the scope or the spirit of the embodiments.

As specified in 3GPP TS 36.331 (see 3GPP TS 36.331 V8.5.0 (2009-03), Evolved Universal Terrestrial Radio Access (E-UTRA); Radio Resource Control (RRC); Protocol specification, which is incorporated herein by reference), a bitmap of either oneFrame or fourFrames can be used to indicate the MBSFN subframe pattern under description subframeAllocation, which provides a micro MBSFN allocation pattern.

Besides the micro MBSFN subframe allocation pattern, there are also macro MBSFN radio frame allocation principles. Radio frames that contain MBSFN subframes occur when equation expressible as:

$$\text{SFN mod radioFrameAllocationPeriod} = \text{radioFrameAllocationOffset}$$

is satisfied (see 3GPP TS 36.331 V8.5.0 (2009-03), Evolved Universal Terrestrial Radio Access (E-UTRA); Radio Resource Control (RRC); Protocol specification). The MBSFN radio frame allocation repetition period (radioFrameAllocationPeriod) may be selected from a set of {1, 2, 4, 8, 16, 32}. An indication (radioFrameAllocationOffset) which indicates the first radio frame which contains MBSFN subframes within one repetition period may be selected from a set of {0, ..., 7}. For example, if the radioFrameAllocationPeriod is eight (8), the radioFrameAllocationOffset is five (5) and a oneFrame pattern is chosen, that means there will be one radio frame containing a MBSFN subframe every eight (8) radio frames and the radio frame containing a MBSFN subframe is the (5+1)-th one within each of the eight (8) radio frames. Furthermore, within the 6-th radio frame, the subframes indicated by oneFrame pattern are MBSFN subframes.

The radioFrameAllocationPeriod cannot be one (1) or two (2) when fourFrames is used for subframeAllocation.

Therefore, the radio frames that contain MBSFN subframes are expressed as $$SFN = i \times P_{MBSFN} + O_{MBSFN} \quad (1)$$

where $P_{MBSFN}$ is the radioFrameAllocationPeriod, $O_{MBSFN}$ is the radioFrameAllocationOffset, and i is an integer value. As discussed above, $P_{MBSFN}$ is selected from a set of {1, 2, 4, 8, 16, 32} for oneFrame and selected from a set of {4, 8, 16, 32} for fourFrames. Parameter $O_{MBSFN}$ takes value of (0, ..., 7) while satisfying $O_{MBSFN} < P_{MBSFN}$.

Measurement Gap—If a UE requires measurement gaps to identify and measure inter-frequency and/or inter-RAT cells, the E-UTRAN must provide a single pattern of measurement gaps with constant gap duration to allow for a concurrent monitoring of all frequency layers and RATs. According to the 3GPP LTE technical standards, the measurement gap is defined to be six (6) ms in duration (or six (6) subframes long).

Figure 3:
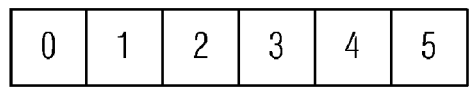
FIG. 3 is a diagram of a measurement gap.

FIG. 3 illustrates a measurement gap 300. As discussed previously, measurement gap 300 comprises six subframes. During a measurement gap, such as measurement gap 300, the UE may not transmit or receive any data since the UE is busy performing measurements.

Although the discussion focuses on a measurement gap that is six subframes in duration, the embodiments described herein may be operable with a measurement gap of any duration. Therefore, the discussion of a six subframe measurement gap should not be construed as being limiting to either the scope or the spirit of the embodiments.

As defined in 3GPP TS 36.331, a UE sets up the measurement gap configuration indicated by a measGapConfig in accordance with a received gapOffset, i.e., each gap starts at an SFN and subframe meeting the following conditions:

$$SFN \bmod T = FLOOR(gapOffset/10),$$

and $$subframe = gapOffset \bmod 10,$$

with T=TGRP/10 as defined in 3GPP TS 36.133 (see 3GPP TS 36.133 V8.5.0 (2009-03), Evolved Universal Terrestrial Radio Access (E-UTRA); Requirements for support of radio resource management). Currently, TGRP may be 40 ms or 80 ms, which is labeled as measurement gap repetition period (MGRP) in Table 8.1.2.1-1 of 3GPP TS 36.133. As used herein, TGRP and MGRP are interchangeable. Thus the radio frames corresponding to measurement gaps are expressible as:

$$SFN = j \times T + G_{gap} \quad (2)$$

where j is an integer, $G_{gap}$=FLOOR(gapOffset/10), and T equals 4 or 8.

In the above, the measurement configuration parameters are sent by an eNB to a UE. A MeasConfig identity entity (IE) specifies measurements to be performed by the UE, and covers intra-frequency, inter-frequency, and inter-RAT mobility as well as configuration of measurement gaps. A MeasGapConfig IE specifies a configuration of the measurement gaps and controls setup/release of measurement gaps. Parameter gapOffset takes value of (0 ... 39) for gap offset of Gap Pattern Id "0" with TGRP=40 ms, which means $G_{gap}$ takes value of (0, ..., 3). Parameter gapOffset takes value of (0 ... 79) for gap offset of Gap Pattern Id "1" with TGRP=80 ms, which means $G_{gap}$ takes value of (0, ..., 7).

Table 1, shown below, replicates Table 8.1.2.1-1 of 3GPP TS 36.133 and illustrates two types of gap patterns that are currently defined. For both gap patterns, the measurement gap length is 6 ms, i.e., each measurement gap lasts 6 ms, with a measurement gap repetition period (MGRP) of either 40 ms or 80 ms. In other words, the measurement gap is repeated every 40 ms or 80 ms in a period of 480 ms. Specifically:

For MGRP=40 ms; 12 measurement gaps, each 6 ms in duration, are configured for the 480 ms period. Out of the 72 ms (12×6), at least 60 ms is available for inter-frequency and inter-RAT measurement.

For MGRP=80 ms; 6 measurement gaps, each 6 ms in duration, are configured for the 480 ms period. Out of the 36 ms (6×6), at least 30 ms is available for inter-frequency and inter-RAT measurement.

TABLE 1

| Gap Pattern Id | MeasurementGap Length (MGL, ms) | Measurement Gap Repetition Period (MGRP, ms) | Minimum available time for inter-frequency and inter-RAT measurements during 480 ms period (Tinter1, ms) | Measurement Purpose |
| --- | --- | --- | --- | --- |
| 0 | 6 | 40 | 60 | Inter-Frequency E-UTRAN FDD and TDD, UTRAN FDD, GERAN, LCR TDD, HRPD, CDMA2000 1x |
| 1 | 6 | 80 | 30 | Inter-Frequency E-UTRAN FDD and TDD, UTRAN FDD, GERAN, LCR TDD, HRPD, CDMA2000 1x |

The measurement period repeats till the eNB notifies the UE to stop performing measurements. In particular, the UE shall release the measurement gap configuration, if the received measConfig includes the measGapConfig, and measGapConfig is set to "release."

For a type 1 RN, the RN appears as a normal eNB to a UE that it is serving. Thus the RN has a responsibility to schedule the MBSFN subframes to its UEs as well as a responsibility to notify the UEs of a measurement gap. For a UE attached to a type 1 RN, but has poor connection with the RN, the UE is likely to have the need to perform measurements in a measurement gap. In this case, there are two sets of subframes where the UE has no communication with the RN.

1) MBSFN Set. The UE will not receive data from the RN during the MBSFN subframes configured in the access link for communication between RN and donor eNB in the backhaul link. The UE can at most receive control information, e.g., ACK/NACK, from the RN in a control region during the MBSFN set. The MBSFN set is defined for the entire relay cell and the configuration is broadcast to all UEs.

2) MeasurementGap set. The UE does not receive any data from the RN during a measurement gap, and the UE is not expected to tune its receiver on the E-UTRAN serving carrier frequency. Additionally, the UE does not transmit in the subframe occurring immediately after the measurement gap for FDD operation. The situation for TDD operation is similar. The MeasurementGap set is defined for an individual UE with the need to perform measurements.

If the MBSFN Set and the MeasurementGap set do not overlap, the UE and the RN may not be able to communicate (exchange messages) for an extended period of time, thereby diminishing an efficiency of the access link between the RN and the UE. It is therefore advantageous to have the MBSFN Set and the MeasurementGap set overlap as much as possible.

Since the MBSFN set is defined for the entire relay cell, but the MeasurementGap set is defined for an individual UE with the need to perform measurements, this goal can be achieved by defining the MeasurementGap set intelligently in a scheduler of the RN.

The defining of the MeasurementGap set may be performed at two levels:

Micro allocation, which is concerned with alignment of subframes in a radio frame. This involves the bitmap of subframeAllocation in MBSFN configuration, and (gapOffset mod 10) for measurement gap configuration, and Macro allocation, which is concerned with alignment of radio frames. This involves radioFrameAllocationPeriod and radioFrameAllocationOffset for MBSFN configuration of Equation (1), and FLOOR(gapOffset/10) for measurement gap configuration of Equation (2).

As discussed previously, micro allocation may be concerned with an alignment of subframes within a radio frame. Within a radio frame, measurement gaps may nullify communication opportunities. A number of communications opportunities nullified by measurement gaps may be dependent on factors such as the MBSFN configuration of the radio frame and subframe, and TGRP and a gap offset (gapOffset) of the measurement gaps.

Figure 4:
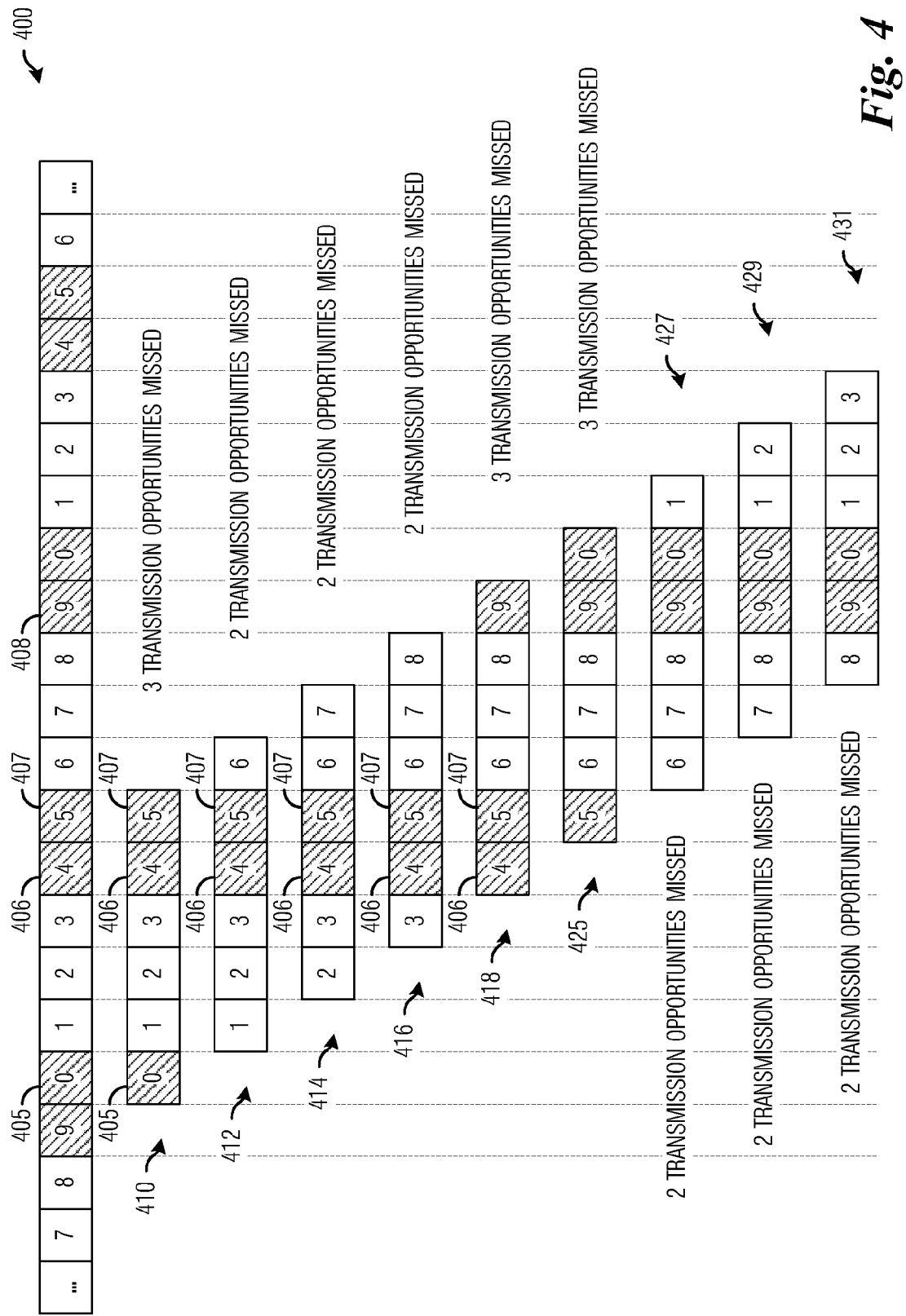
FIG. 4 is a diagram of a sequence of subframes of several radio frames.

FIG. 4 illustrates a sequence of subframes 400 of several radio frames. As shown in FIG. 4, sequence of subframes 400 comprises a single complete frame and a first partial frame at a first end of the single complete frame and a second partial frame at a second end of the single complete frame. Sequence of subframes 400 includes two different types of subframes. A first subframe type (indicated by a cross-hatched box) represents subframes that cannot be configured as MBSFN subframes. A second subframe type (indicated by a clear box) represents subframes that can be configured as MBSFN subframes. Sequence of subframes 400 are for use in FDD operation, so subframes #0, #4, #5, and #9 (shown as subframes 405, 406, 407, and 408) cannot be configured as MBSFN subframes.

Although sequence of subframes 400 illustrates an example wherein subframes #0, #4, #5, and #9 may not be configured as MBSFN subframes, other configurations for sequence of subframes 400 may be possible. Therefore, the discussion of sequence of subframes 400 as shown in FIG. 4 should not be construed as being limiting to either the scope or spirit of the embodiments.

Also shown in FIG. 4 are several possible measurement gaps, with each of the measurement gaps having different gap offset. To simplify discussion, let all subframes that may be configured as MBSFN subframes be configured as MBSFN subframes as shown in FIG. 4, although it is possible that the MBSFN configuration may use a subset of {1, 2, 3, 6, 7, 8} subframes for MBSFN. Then, there are only a limited number of data transmission opportunities per frame, i.e., the subframes that are not configured as MBSFN subframes.

For example, measurement gap 410 has a gapOffset of zero (0) so it is in line with the single complete subframe. Since measurement gap 410 is aligned with the single complete frame, measurement gap 410 encompasses subframes #0, #4, and #5 (subframes 405, 406, and 407) of the single complete frame. Therefore, the UE may not be able to receive data during those three subframes. Measurement gap 412 has a gapOffset of one (1), so it is aligned with subframe #1 of the single complete frame and encompasses subframes #4 and #5 (subframes 406 and 407) of the single complete frame. Therefore, the UE may not be able to receive data during those two subframes.

Similarly, with measurement gap 414, the UE may not be able to receive data during two subframes, while with measurement gap 416, the UE may not be able to receive data during two subframes. For measurement gaps 418, 425, 427, 429, and 431, the UE may not be able to receive data during three, three, two, two, and two subframes, respectively.

Measurement gaps starting at subframe #1, #2, #3, #6, #7, and #8 ((gapOffset mod 10) is equal to 1, 2, 3, 6, 7, and 8) are more efficient than measurement gaps starting at subframes #0, #4, #5, and #9 since only two reception chances are missed, while three reception chances are missed for measurement gaps starting at subframes #0, #4, #5, and #9.

Additionally, a regular pattern may be seen from sequence of subframes 400. The pattern being three (3) available MBSFN subframes followed by two (2) non-MBSFN subframes. Therefore, a pattern of available and non-available subframes repeats twice within a single radio frame. Therefore the same measurement gap and MBSFN overlap pattern exists between the two halves of a radio frame. In other words, the measurement gaps starting at subframes #0 and #5 block the same number of transmission chances. Similarly, so do measurement gaps starting at subframes #1 and #6, subframes #2 and #7, subframes #3 and #8, subframes #4 and #9.

Therefore, for sequence of subframes 400 as shown in FIG. 4, measurement gaps with (gapOffset mod 10) equal to 1, 2, 3, 6, 7, and 8 (i.e., measurement gaps that start at subframes #1, #2, #3, #6, #7, and #8) offer the fewest missed reception chances.

In general, for a given MBSFN allocation, analysis should be performed to determine the best measurement gap pattern via gapOffset.

When oneFrame bitmap pattern is used, the access link efficiency is maximized if the earliest and latest MBSFN subframe within a radio frame is not more than 6 subframes apart. For example, if the earliest MBSFN subframe is #1, and the latest MBSFN subframe is #6 or lower, then a measurement gap with (gapOffset mod 10)=1 can be used.

When fourFrames bitmap pattern is used, the measurement gap may be defined to overlap the region which has the highest MBSFN subframe density.

As discussed previously, macro allocation may be concerned with an alignment of radio frames. Considering that the MBSFN subframe allocation repetition period can be selected from a set of $\{1, 2, 4, 8, 16, 32\}$ radio frames, and the measurement Gap can be selected from a set of $\{4, 8\}$ radio frames, macro allocation can be designed so that the radio frames of MBSFN and radio frames of measurement gap overlap as much as possible. For the oneFrame bitmap or the fourFrames bitmap with MBSFN subframe populated most densely in the first radio frame, requiring that the SFN in Equation (1) and the SFN in Equation (2) overlap.

When $P_{MBSFN}<T$, T is a multiple of $P_{MBSFN}$ considering the possible parameter values. Radio frames containing measurement gaps occur less frequently than the radio frames containing MBSFN subframes. Multiple options exist for $G_{gap}$.

a) When $P_{MBSFN}=1$ and $O_{MBSFN}=0$. $G_{gap}$ can take any valid value;

b) When $P_{MBSFN}=2$. If $O_{MBSFN}=0$, $G_{gap}$ can take a valid even value. If $O_{MBSFN}=1$, $G_{gap}$ can take a valid odd value. Overall, $G_{gap}$ can take a valid value of form $$2 \times m + O_{MBSFN} = P_{MBSFN} \times m + O_{MBSFN},$$

where m is an integer;

c) When $P_{MBSFN}=4$, T=8. Similar to (b), $G_{gap}$ can take a valid value of form $$P_{MBSFN} \times m + O_{MBSFN},$$

where m is an integer.

When $P_{MBSFN}=T$, $G_{gap}=O_{MBSFN}$ should be assigned to maximize overlapping of measurement gaps with radio frames containing MBSFN subframes.

When $P_{MBSFN} \geq T$, $P_{MBSFN}$ is a multiple of T considering the possible parameter values. Radio frames containing measurement gaps occur more frequently than the radio frames containing MBSFN subframes. Not all radio frames with measurement gaps can align with radio frames with MBSFN subframes. In this case, $G_{gap}=O_{MBSFN}$ should be assigned to maximize their overlap.

The analysis above assumes a oneFrame bitmap, or a fourFrames bitmap with MBSFN subframe populated most densely in the first radio frame. If a fourFrames bitmap with MBSFN subframe NOT populated most densely in the first radio frame, the same principle of maximizing measurement gap with MBSFN subframes apply, but the specific rules may need to be modified. For example, rather than having SFN=i× $P_{MBSFN}+O_{MBSFN}=j \times T+G_{gap}$, the rule may be changed to $i \times P_{MBSFN}+O_{MBSFN}+D=j \times T+G_{gap}$, where D indicates the radio frame with the highest density of MBSFN subframe within the fourFrames bitmap, D=$\{0, 1, 2, 3\}$.

FIG. 5 illustrates a flow diagram of controller operations 500 in determining a pattern (or an offset for a pattern) for use by a communications device, such as a UE, to minimize transmission opportunity blocking for the communications device. Controller operations 500 may be indicative of operations occurring in a controller, such as an RN, of a communications system that includes RNs, wherein the RNs may become unavailable to its UEs based on a first subframe pattern, and wherein some UEs may need to use a second subframe pattern to detect transmissions from other communications devices. According to an embodiment, the first subframe pattern is applicable to all communications devices in the communications system, while the second subframe pattern is uniquely determined for each UE needing to detect transmissions from other communications devices. Controller operations 500 may occur while the controller is in a normal operating mode and while there are UEs that need to be assigned a second subframe pattern. Controller operations 500 may occur periodically to allow for the updating of assigned second subframe patterns and to assign second subframe patterns to new UEs, or controller operations 500 may occur upon a detection of an occurrence of an event, such as an error rate reaching a threshold, and so on.

Controller operations 500 may begin with the controller broadcasting the first subframe pattern to communications devices (such as UEs) operating in the communications system (block 505). As discussed previously, the first subframe pattern may be applicable to all communications devices in the communications system.

The controller may then determine a subset of UEs out of the UEs that it is serving that may need to perform a search during a second subframe pattern (block 510). According to an embodiment, UEs in the subset of UEs may include UEs that may need to make measurements of spectrum, e.g., to identify and measure inter-frequency and/or inter-RAT cells, or so on.

From the set of UEs that need to perform searches, the controller may select one UE (block 515). For the selected UE, the controller may determine a second subframe pattern (block 520). According to an embodiment, the second subframe pattern may be fixed and the controller may simply determine a parameter for the second subframe pattern, e.g., gapOffset, to minimize a loss of transmission opportunities for the selected UE. In addition to determining the offset for the second subframe pattern for the selected UE, the controller may attempt to distribute the offset over a number of possible offsets that minimize the loss of transmission opportunities so that a number of UEs in the set of UEs assigned the same offset for the second subframe pattern is also minimized.

According to an alternative embodiment, if the second subframe pattern is not fixed, then the controller may determine an actual second subframe pattern for the selected UE as well as an offset if necessary. Again, the controller may attempt to determine the second subframe pattern with consideration for other UEs in the set of UEs so that the second subframe patterns for all of the UEs in the set of UEs is as distributed as evenly as possible (or some other evaluation criteria is met).

Determining the second subframe pattern may involve a search of viable second subframe patterns and then selecting a second subframe pattern that results in a minimum number of lost transmission opportunities.

Alternatively, if the first subframe pattern and the second subframe pattern are periodic or if expressions for the first subframe pattern and the second subframe pattern may be derived, then mathematical techniques may be used to determine the second subframe pattern that results in a minimum number of lost transmission opportunities. With the expressions for the first subframe pattern and the second subframe pattern, the controller may determine the number of transmission opportunities lost using the expressions. For example, with a oneFrame bitmap pattern used to describe the first subframe pattern, the access link efficiency is maximized if the earliest and latest MBSFN subframe within a radio frame is not more than 6 subframes apart. While, if a fourFrames bitmap pattern is used to describe the first subframe pattern, the second subframe pattern may be defined to overlap the region which has the highest MBSFN subframe density.

Additionally, for a oneFrame bitmap, or a fourFrames bitmap with MBSFN subframe populated most densely in the first radio frame, minimizing the number of transmission opportunities lost requires the SFN in Equation (1) and SFN in Equation (2) overlap. Hence, multiple options exist for $G_{gap}$.

a) When $P_{MBSFN}=1$ and $O_{MBSFN}=0$. $G_{gap}$ can take any valid value;

b) When $P_{MBSFN}=2$. If $O_{MBSFN}=0$, $G_{gap}$ can take a valid even value. If $O_{MBSFN}=1$, $G_{gap}$ can take a valid odd value. Overall, $G_{gap}$ can take a valid value of form $$2 \times m + O_{MBSFN} = P_{MBSFN} \times m + O_{MBSFN},$$

where m is an integer;

c) When $P_{MBSFN}=4$, T=8. Similar to (b), $G_{gap}$ can take a valid value of form $$P_{MBSFN} \times m + O_{MBSFN},$$

where m is an integer.

When $P_{MBSFN}=T$, $G_{gap}=O_{MBSFN}$ should be assigned to maximize overlapping of measurement gaps with radio frames containing MBSFN subframes.

When $P_{MBSFN} \geq T$, $P_{MBSFN}$ is a multiple of T considering the possible parameter values. Radio frames containing measurement gaps occur more frequently than the radio frames containing MBSFN subframes. Not all radio frames with measurement gaps can align with radio frames with MBSFN subframes. In this case, $G_{gap}=O_{MBSFN}$ should be assigned to maximize their overlap.

The analysis presented herein assumes a oneFrame bitmap, or a fourFrames bitmap with MBSFN subframe populated most densely in the first radio frame. If a fourFrames bitmap with MBSFN subframe NOT populated most densely in the first radio frame, the same principle of maximizing measurement gap with MBSFN subframes apply, but the specific rules may need to be modified. For example, rather than having $SFN=i \times P_{MBSFN}+O_{MBSFN}=j \times T+G_{gap}$, the rule may be changed to $i \times P_{MBSFN}+O_{MBSFN}+D=j \times T+G_{gap}$, where D indicates the radio frame with the highest density of MBSFN subframe within the fourFrames bitmap, D={0, 1, 2, 3}.

The above example for determining the second subframe pattern focuses on the second subframe pattern being a measurement gap that is six subframes in length. However, the embodiments may be operable with other subframe patterns wherein the subframe patterns are specifically assigned to individual UEs. Therefore, the discussion of a measurement gap should not be construed as being limiting to either the scope or spirit of the embodiments.

The controller may then send the second subframe pattern, an indication of the second subframe pattern, or some other information (such as a parameter of the second subframe pattern) sufficient to describe the second subframe pattern to the selected UE (block 525). The controller may then perform a check to determine if there are more UEs in the set of UEs that require a second subframe pattern but have not received one (block 530). If there are more UEs that require a second subframe pattern but have not received one, then the controller may return to block 515 to select another UE out of the set of UEs and determine a second subframe pattern for the selected UE. If there are no more UEs that require a second subframe pattern but have not received one, then controller operations 500 may then terminate.

FIG. 6 illustrates a flow diagram of controller operations 600 in determining a second subframe pattern for a communications device, such as a UE, to minimize transmission opportunity blocking with a first subframe pattern. Controller operations 600 may be indicative of operations occurring in a controller, such as an RN, of a communications system that includes RNs, wherein the RNs become unavailable to its UEs based on a first subframe pattern, and wherein some UEs may need to use a second subframe pattern to detect transmissions from other communications devices. According to an embodiment, the first subframe pattern is applicable to all communications devices in the communications system, while the second subframe pattern is uniquely determined for each UE needing to detect transmissions from other communications devices. Controller operations 500 may occur while the controller is in a normal operating mode and while there are UEs that need to be assigned a second subframe pattern. Controller operations 500 may occur whenever the controller needs to determine a second subframe pattern for a UE.

Controller operations 600 may begin with the controller initializing variables that it will use in determining the second subframe pattern (block 605). According to an embodiment, variable that the controller may use may include an index variable to keep track of an offset for the second subframe pattern (second pattern offset), a variable representing a number of transmission opportunities lost (# of transmission opportunities lost), a variable representing a minimum number of transmission opportunities lost (min # of transmission opportunities lost), a variable representing a second subframe pattern offset corresponding to the minimum number of transmission opportunities lost (min second pattern offset), and so on.

For discussion purposes, let the offset for the second subframe pattern be initialized to zero or no offset with respect to the first subframe pattern. The controller may then determine the number of transmission opportunities lost (block 610). According to an embodiment, determining the number of transmission opportunities lost may be performed by comparing the first subframe pattern with the second subframe pattern with the offset for the second subframe pattern. For example, referencing FIG. 4, the controller may compare sequence of subframes 400 (i.e., the first subframe pattern) with measurement gap 410 (i.e., the second subframe pattern with zero offset) to determine the number of transmission opportunities lost.

The controller may compare the number of transmission opportunities lost with the minimum number of transmission opportunities lost, which may be set to a very large number on an initial iteration of controller operations 600 (block 615). If the number of transmission opportunities lost is less than the minimum number of transmission opportunities lost, then the controller may set the minimum number of transmission opportunities lost to the number of transmission opportunities lost and the second subframe pattern offset corresponding to the minimum number of transmission opportunities lost equal to the second subframe pattern offset (block 620).

The controller may also perform a check to determine that all possible second subframe pattern offsets have been checked (block 625). If all possible second subframe pattern offsets have been checked, then the second subframe pattern offset corresponding to the minimum number of transmission opportunities lost results in the second subframe pattern that results in the minimum number of transmission opportunities lost and controller operations 600 may then terminate.

If the controller has not checked all possible second subframe pattern offsets, then the controller may increment the second subframe pattern offset (block 630) and return to block 610 to determine the number of transmission opportunities lost for the newly incremented second subframe pattern offset.

If the number of transmission opportunities lost is not less than the minimum number of transmission opportunities lost (block 615), then the controller may increment the second subframe pattern offset (block 630) and return to block 610 to determine the number of transmission opportunities lost for the newly incremented second subframe pattern offset. While the description above explains the procedure of looking (e.g., searching, computing, and so forth) for the second subframe pattern offset, alternatively, parameters for the best second subframe pattern offset can be stored, which can be retrieved without iterative search when the parameters need to be assigned to a UE.

Figure 7:
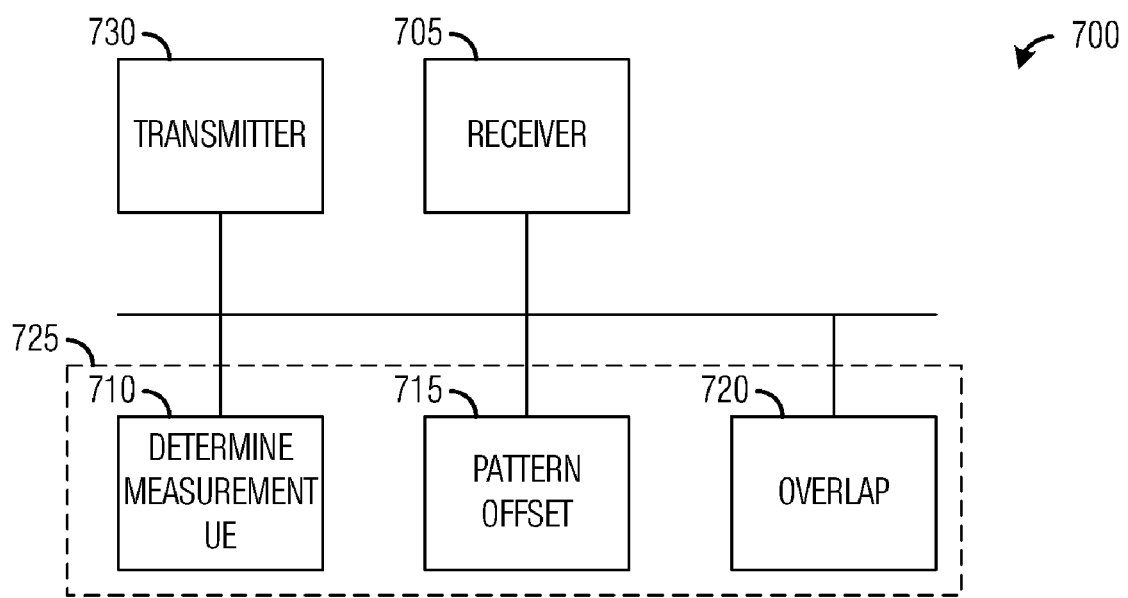
FIG. 7 is a diagram of an alternate illustration of a controller.

FIG. 7 provides an alternate illustration of a controller 700. Controller 7 may be used to implement various ones of the embodiments discussed herein. As shown in FIG. 7, a receiver 705 is configured to receive information. A determine measurement unit 710 is configured to determine which communications devices served by controller 700 needs to search for the presence of an alternate controller. An offset unit 715 is configured to determine a second pattern or a parameter of the second pattern based on the first pattern descriptive of radio frames transmitted by the controller. An overlap unit 720 is configured to determine an overlap of subframes of radio frames based on the first pattern and the second pattern and the parameter of the second pattern. Transmitter 730 is configured to transmit the radio frames based on the first pattern as well as the second pattern or the parameter of the second pattern.

The elements of controller 700 may be implemented as specific hardware logic blocks. In an alternative, the elements of controller 700 may be implemented as software executing in a processor, controller, application specific integrated circuit, or so on. In yet another alternative, the elements of controller 700 may be implemented as a combination of software and/or hardware.

As an example, receiver 705 and transmitter 730 may be implemented as specific hardware blocks, while determine measurement unit 710, offset unit 715, and overlap unit 720 may be software modules executing in a processor 725 or custom compiled logic arrays of a field programmable logic array.

Advantageous features of embodiments of the invention may include: a method for controller operation, the method comprising: broadcasting a configuration of radio frames to communications devices being served by the controller; determining a subset of communications devices out of the communications devices being served by the controller, wherein each communications device in the subset of communications devices is required to search for the presence of an alternate controller; and for each communications device in the subset of communications devices, determining a measurement gap offset as a function of the configuration of radio frames, and transmitting the measurement gap offset to the communications device.

The method could further include, where a measurement gap offset is determined such that a measurement gap starting at the measurement gap offset minimally reduces a number of transmission chances for the communications device to communicate with the controller.

The method could further include, wherein the search for the presence of an alternate controller comprises, monitoring available frequency layers.

The method could further include, wherein monitoring further comprises monitoring available radio access technologies.

The method could further include, wherein the configuration specifies a nature of subframes in the radio frames.

The method could further include, wherein the configuration comprises a bitmap.

The method could further include, wherein the configuration comprises a bitmap of a single radio frame or a bitmap of four consecutive radio frames.

The method could further include, wherein the configuration comprises a bitmap of a single radio frame, and the method further comprises, computing the configuration of radio frames so that a separation between an earliest subframe within a radio frame not suitable for controller-communications device communications only and a latest subframe within the radio frame not suitable for controller-communications device communications only is not more than a duration of a measurement gap.

The method could further include, wherein determining a measurement gap offset comprises, setting the measurement gap offset modulo radio frame duration equal to a location of the earliest subframe not suitable for controller-communications device communications, where modulo (x, y) returns an integer remainder of x divided by y, x and y are integers.

The method could further include, wherein the configuration comprises a bitmap of four consecutive radio frames, and wherein computing a measurement gap offset comprises: setting the measurement gap offset a value; counting a number of subframes in an overlap between radio frames and the measurement gap having the measurement gap offset that are only suitable for controller-communications device communications; repeating the setting and the counting for remaining measurement gap offset values; and setting the measurement gap offset value to a value that minimizes the count.

The method could further include, wherein computing a measurement gap offset further comprises, maximizing an overlap between the measurement gap and a radio frame having a highest concentration of subframes not suitable for controller-communications device communications only.

The method could further include, wherein maximizing an overlap comprises, maximizing an overlap between $SFN=i\times P_{MBSFN}+O_{MBSFN}$ and $SFN=j\times T+G_{gap}$, where $P_{MBSFN}$ is the radioFrameAllocationPeriod, $O_{MBSFN}$ is the radioFrameAllocationOffset, i and j are integer value, $T=TGRP/N$, $G_{gap}=FLOOR(gapOffset/N)$, N is a number of subframes in a radio frame, TGRP is a measurement gap repetition period, gapOffset is the measurement gap offset, FLOOR(x) returns a largest integer value smaller than x.

The method could further include, wherein $P_{MBSFN}<T$, and T is a multiple of $P_{MBSFN}$, and wherein maximizing an overlap between $SFN=i\times P_{MBSFN}+O_{MBSFN}$ and $SFN=j\times T+G_{gap}$ comprises: setting $G_{gap}$ to any valid value in response to determining that $P_{MBSFN}$ is equal to 1, and $O_{MBSFN}$ is equal to 0; setting $G_{gap}$ to any valid even value in response to determining that $P_{MBSFN}$ is equal to 2, and $O_{MBSFN}$ is equal to 0; setting $G_{gap}$ to any valid odd value in response to determining that $P_{MBSFN}$ is equal to 2, and $O_{MBSFN}$ is equal to 1; and setting $G_{gap}$ to any valid value of form $P_{MBSFN}\times m+O_{MBSFN}$ in response to determining that $P_{MBSFN}$ is equal to 4, and T is equal to 8, where m is an integer.

The method could further include, wherein maximizing an overlap between $SFN=i\times P_{MBSFN}+O_{MBSFN}$ and $SFN=j\times T+G_{gap}$ further comprises, setting $G_{gap}=O_{MBSFN}$ in response to determining that $P_{MBSFN}=T$.

The method could further include, wherein maximizing an overlap between $SFN = i \times P_{MBSFN} + O_{MBSFN}$ and $SFN = j \times T + G_{gap}$ further comprises, setting $G_{gap} = O_{MBSFN}$ in response to determining that $P_{MBSFN} \geq T$.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for controller operations, the method comprising:
    broadcasting a first plurality of subframes to a plurality of communications devices served by a controller in accordance with a first pattern of measurement gaps, the first pattern of measurement gaps specifying a first plurality of time intervals during which none of the first plurality of subframes are transmitted;
    determining a second pattern of measurement gaps specifying a second plurality of time intervals during which none of a second plurality of subframes are to be transmitted, wherein the second pattern of measurement gaps is determined in accordance with the first pattern of measurement gaps such that at least some of the second plurality of time intervals overlap with some of the first plurality time intervals; and
    communicating the second pattern of measurement gaps to a first one of the plurality of communications devices.

2. The method of claim 1, wherein the first communications device monitors an available frequency band during the second plurality of time intervals to search for a presence of an alternate controller.

3. The method of claim 2, wherein monitoring an available frequency band comprises monitoring available radio access technologies.

4. The method of claim 1, wherein communicating the second pattern of measurement gaps comprises transmitting a parameter corresponding to the second pattern of measurement gaps.

5. The method of claim 4, wherein the second pattern of measurement gaps comprises a measurement gap offset, and wherein the parameter indicates the measurement gap offset.

6. The method of claim 1, wherein the first plurality of subframes comprise Multi-Media Broadcast over a Single Frequency Network (MBSFN) subframes.

7. The method of claim 1, wherein determining the second pattern of measurement gaps comprises identifying a measurement gap offset that produces a maximum overlap between the second plurality of time intervals and the first plurality of time intervals, the maximum overlap between the second plurality of time intervals and the first plurality of time intervals resulting in a minimum number of missed transmission opportunities during communication of the second plurality of subframes.

8. A method for controller operations, the method comprising:
    broadcasting a first plurality of subframes in accordance with a first pattern of measurement gaps to a plurality of communications devices being served by a controller, the first plurality of measurement gaps specifying a first plurality of time intervals over which none of the first plurality of subframes are transmitted;
    determining a measurement gap offset for a second pattern of measurement gaps specifying a second plurality of time intervals such that at least some of the second plurality of time intervals overlap with some of the first plurality of time intervals, the second plurality of time intervals being intervals during which none of a second plurality of subframes are transmitted; and
    transmitting a parameter specifying the measurement gap offset to a first one of the plurality of communications devices.

9. The method of claim 8, wherein the first plurality of subframes comprise a bitmap of subframes in a single radio frame.

10. The method of claim 8, wherein the first plurality of subframes comprise a bitmap of subframes in four consecutive radio frames.

11. The method of claim 8, wherein determining the measurement gap offset for the second pattern of measurement gaps further comprises maximizing an overlap between the second plurality of time intervals and the first plurality of time intervals.

12. An apparatus comprising:
    a processor; and
    a non-transitory computer readable storage medium storing programming for execution by the processor, the programming including instructions to:
    broadcast a first plurality of subframes to a plurality of communications devices served by a controller in accordance with a first pattern of measurement gaps, the first pattern of measurement gaps specifying a first plurality of time intervals during which none of the first plurality of subframes are transmitted;
    determine a second pattern of measurement gaps specifying a second plurality of time intervals during which none of a second plurality of subframes are to be transmitted,
    wherein the instructions to determine the second pattern of measurement gaps includes instructions to determine the second pattern of measurement gaps in accordance with the first pattern of measurement gaps such that at least some of the second plurality of time intervals overlap with some of the first plurality time intervals; and
    transmit the second pattern of measurement gaps to a first one of the plurality of communications devices.

13. The apparatus of claim 12, wherein the first communications device monitors an available frequency band during the second plurality of time intervals to search for a presence of an alternate controller.

14. The apparatus of claim 12, wherein the instructions to communicate the second pattern of measurement gaps include instructions to transmit a parameter corresponding the second pattern of measurement gaps.

15. The apparatus of claim 12, wherein the first plurality of subframes comprise Multi-Media Broadcast over a Single Frequency Network (MBSFN) subframes.

16. The apparatus of claim 12, wherein the instructions to determine the second pattern of measurement gaps include instructions to identify a measurement gap offset that produces a maximum overlap between the second plurality of time intervals and the first plurality of time intervals, the maximum overlap between the second plurality of time intervals and the first plurality of time intervals resulting in a minimum number of missed transmission opportunities during communication of the second plurality of subframes.

17. An apparatus comprising:
a processor; and
a non-transitory computer readable storage medium storing programming for execution by the processor, the programming including instructions to:
broadcast a first plurality of subframes in accordance with a first pattern of measurement gaps to a plurality of communications devices, the first plurality of measurement gaps specifying a first plurality of time intervals over which none of the first plurality of subframes are transmitted;
determining a measurement gap offset for a second pattern of measurement gaps specifying a second plurality of time intervals such that at least some of the second plurality of time intervals overlap with some of the first plurality of time intervals, the second plurality of time intervals being intervals during which none of a second plurality of subframes are transmitted; and
transmitting a parameter specifying the measurement gap offset to a first one of the plurality of communications devices.

18. The apparatus of claim 17, wherein the first communications device monitors an available frequency band during the second plurality of time intervals to search for a presence of an alternate controller.

19. The apparatus of claim 17, wherein the first plurality of subframes comprise Multi-Media Broadcast over a Single Frequency Network (MBSFN) subframes.

20. The apparatus of claim 17, wherein the instructions to determine the measurement gap offset includes instructions to determine the measurement gap offset that produces a maximum overlap between the second plurality of time intervals and the first plurality of time intervals, the maximum overlap between the second plurality of time intervals and the first plurality of time intervals resulting in a minimum number of missed transmission opportunities during communication of the second plurality of subframes.

* * * * *